(12) United States Patent
Feulner et al.

(10) Patent No.: US 9,909,497 B2
(45) Date of Patent: Mar. 6, 2018

(54) COMBINED STABILITY AND CUSTOMER BLEED WITH DIRT, WATER AND ICE REJECTION

(71) Applicant: United Technologies Corporation, Hartford, CT (US)

(72) Inventors: Matthew R. Feulner, West Hartford, CT (US); Brian D. Merry, Andover, CT (US); Jesse M. Chandler, South Windsor, CT (US); Gabriel L. Suciu, Glastonbury, CT (US); Joseph B. Staubach, Colchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 515 days.

(21) Appl. No.: 14/706,748

(22) Filed: May 7, 2015

(65) Prior Publication Data

US 2016/0326957 A1 Nov. 10, 2016

(51) Int. Cl.
| | |
|---|---|
| *F02C 6/08* | (2006.01) |
| *F04D 27/02* | (2006.01) |
| *F02C 7/052* | (2006.01) |
| *F04D 29/52* | (2006.01) |
| *F04D 29/70* | (2006.01) |

(Continued)

(52) U.S. Cl.
CPC ................. *F02C 6/08* (2013.01); *F02C 3/10* (2013.01); *F02C 7/052* (2013.01); *F02K 3/06* (2013.01); *F04D 27/0215* (2013.01); *F04D 29/526* (2013.01); *F04D 29/701* (2013.01); *F05D 2210/12* (2013.01); *F05D 2220/36* (2013.01); *F05D 2260/607* (2013.01); *F05D 2260/608* (2013.01); *F05D 2270/101* (2013.01); *Y02T 50/675* (2013.01)

(58) Field of Classification Search
CPC .... F02C 6/08; F02C 7/052; F02C 9/18; F02C 3/10; F01D 17/105; F02K 3/06; F04D 27/0215; F04D 29/526; F04D 29/701; F05D 2210/12; F05D 2220/36; F05D 2260/607; F05D 2260/608; F05D 2270/101; Y02T 50/675
See application file for complete search history.

(56) References Cited

U.S. PATENT DOCUMENTS 4,463,552 A * 8/1984 Monhardt ............... F01D 25/32
60/226.1
5,155,993 A * 10/1992 Baughman ............ F04D 27/023
60/226.1
(Continued)

FOREIGN PATENT DOCUMENTS

| EP | 2431590 | 3/2012 |
|---|---|---|
| WO | 2014092778 | 6/2014 |

OTHER PUBLICATIONS

Extended European Search Report dated Sep. 23, 2016 in European Application No. 16168495.6.

Primary Examiner — Woody Lee, Jr.
Assistant Examiner — Sang K Kim
(74) Attorney, Agent, or Firm — Snell & Wilmer L.L.P.

(57) ABSTRACT

A compressor section of a gas turbine engine includes a bleed port having a flow splitter therein so as to define a downstream bleed channel having a downstream inlet and an upstream bleed channel having an upstream inlet that is positioned radially outward from the downstream inlet.

13 Claims, 3 Drawing Sheets

(51) Int. Cl.
*F02C 3/10* (2006.01)
*F02K 3/06* (2006.01)

(56) References Cited

U.S. PATENT DOCUMENTS

| | | | | |
|---|---|---|---|---|
| 7,624,581 | B2 * | 12/2009 | Moniz | F01D 17/105 |
| | | | | 60/226.1 |
| 2007/0137175 | A1 | 6/2007 | Moniz | |
| 2008/0115504 | A1 * | 5/2008 | Martensson | F02C 3/13 |
| | | | | 60/785 |
| 2014/0109589 | A1 * | 4/2014 | Pritchard, Jr. | F02K 3/075 |
| | | | | 60/779 |
| 2014/0245747 | A1 * | 9/2014 | Pritchard, Jr. | F01D 17/105 |
| | | | | 60/782 |
| 2015/0292352 | A1 * | 10/2015 | Marche | F01D 17/148 |
| | | | | 415/116 |

* cited by examiner

COMBINED STABILITY AND CUSTOMER BLEED WITH DIRT, WATER AND ICE REJECTION

FIELD

The present disclosure relates generally to bleed ports of a gas turbine engine and, more particularly, to a bleed port positioned between a low pressure compressor section and a high pressure compressor section.

BACKGROUND

Gas turbine engines typically include compressors having multiple rows, or stages, of rotating blades and multiple stages of stators. The compressors typically compress ingested air, which is then transferred to a combustor, where the compressed air is mixed with fuel and ignited. During flight, a gas turbine engine can be thousands of feet above sea level. Accordingly, the ambient air pressure can be low, making breathing at these altitudes difficult. In order to pressurize cabin air, some of the compressed air from the compressors is directed through an environmental control system and into the cabin.

SUMMARY

What is described is a compressor section of a gas turbine engine that includes a bleed port having a flow splitter therein so as to define a downstream bleed channel having a downstream inlet and an upstream bleed channel having an upstream inlet that is positioned radially outward from the downstream inlet.

Also described is a gas turbine engine that includes a downstream bleed channel having an inner wall therein so as to define an air port configured to receive a first flow and a debris port configured to receive a second flow having more debris therein than the first flow.

Also described is a compressor section of a gas turbine engine that includes a bleed port having a flow splitter therein defining an upstream bleed channel and a downstream bleed channel having an axial portion, a radial portion and a curved portion. The compressor section also includes an inner wall positioned within the downstream bleed channel and defining a debris port and an air port.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

Figure 1:
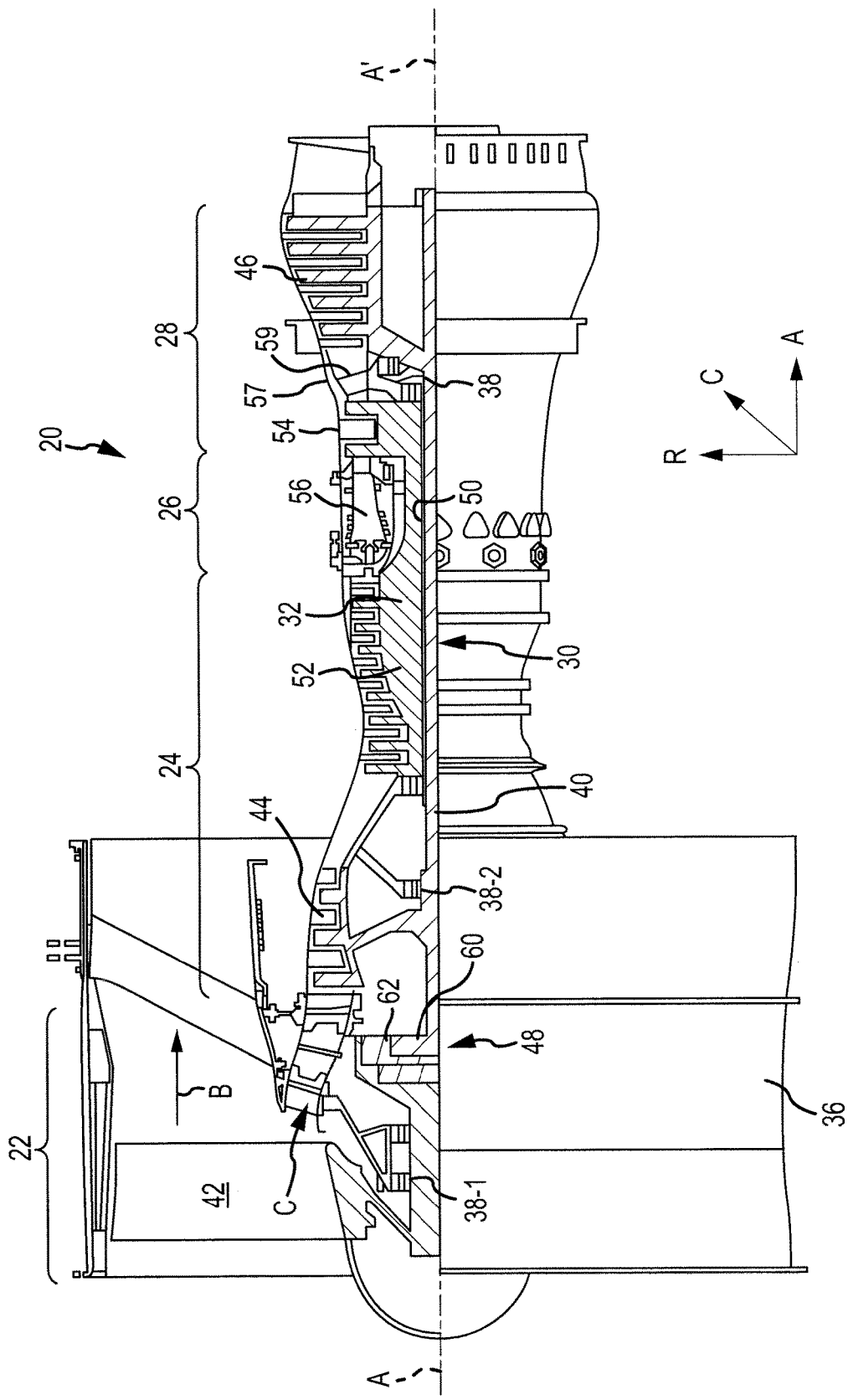
FIG. 1 illustrates a cross-sectional view of an exemplary gas turbine engine, in accordance with various embodiments.

With reference to FIG. 1, a gas turbine engine 20 is provided. An A-R-C axis shown in each of the figures illustrates the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 can be a two-spool turbofan that generally incorporates a fan section 22, a compressor section 24, a combustor section 26 and a turbine section 28. Alternative engines include an augmentor section among other systems or features. In operation, fan section 22 drives coolant along a bypass flow-path B while compressor section 24 drives coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings can be applied to other types of turbine engines including three-spool architectures.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations can alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Geared architecture 48 includes a gear assembly 60 enclosed within a gear housing 62. Gear assembly 60 couples inner shaft 40 to a rotating fan structure. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow D is compressed by low pressure compressor section 44 then high pressure compressor 52, mixed and burned with fuel in combustor 56, then expanded over high pressure turbine 54 and low pressure turbine 46.

Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass geared aircraft engine. The bypass ratio of gas turbine engine 20 can be greater than about six (6). The bypass ratio of gas turbine engine 20 can also be greater than ten (10). Geared architecture 48 can be an epicyclic gear train, such as a star gear system (sun gear in meshing engagement with a plurality of star gears supported by a carrier and in meshing engagement with a ring gear) or other gear system. Geared architecture 48 can have a gear reduction ratio of greater than about 2.3 and low pressure turbine 46 can have a pressure ratio that is greater than about five (5). The bypass ratio of gas turbine engine 20 can be greater than about ten (10:1). The diameter of fan 42 can be significantly greater than that of the low pressure compressor section 44. Low pressure turbine 46 pressure ratio is measured prior to inlet of low pressure turbine 46 as related to the pressure at the outlet of low pressure turbine 46 prior to an exhaust nozzle. It should be understood, however, that the above parameters are exemplary of particular embodiments of a suitable geared architecture engine and that the present disclosure contemplates other turbine engines including direct drive turbofans.

The next generation of turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
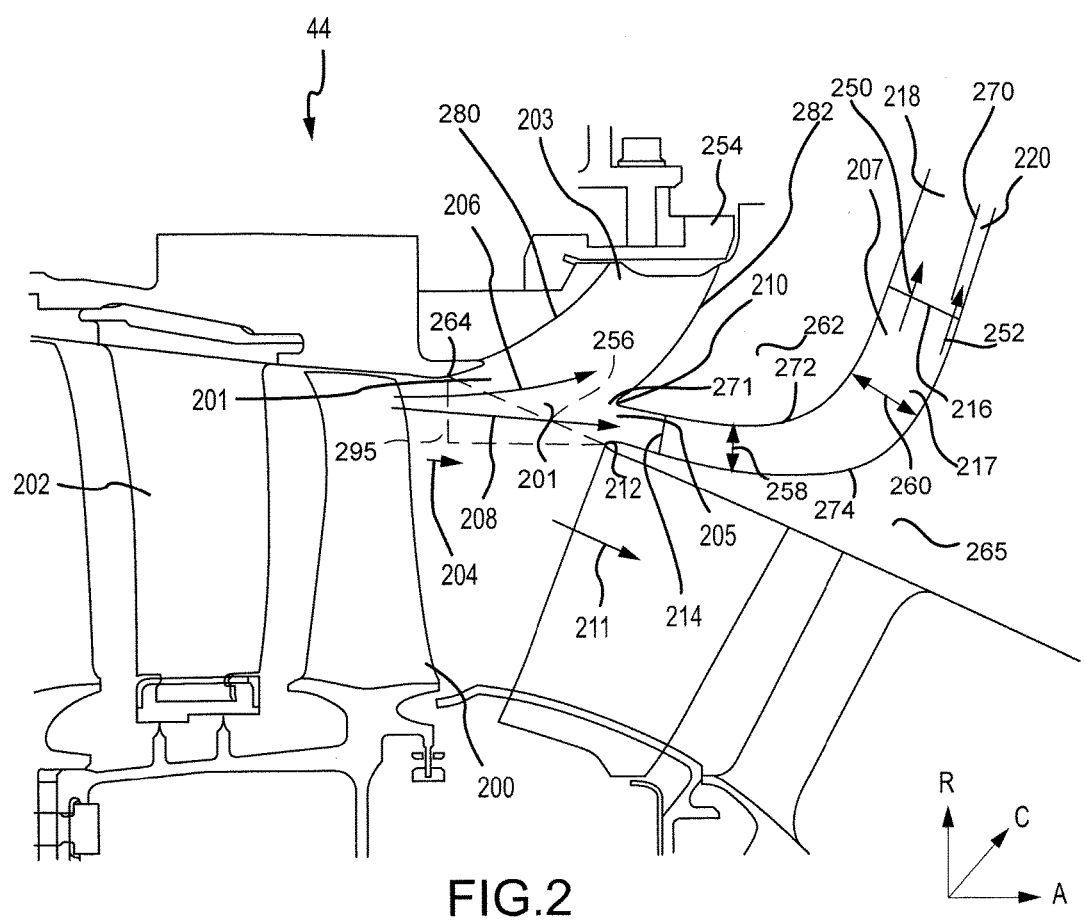
FIG. 2 illustrates a cross-sectional view of an ECS bleed port and a stability bleed port positioned aft of a low pressure compressor section of the gas turbine engine of FIG. 1, in accordance with various embodiments.

With reference now to FIGS. 1 and 2, airflow in low pressure compressor section 44 is conditioned by one or more stators, including a stator 202, and is compressed by one or more rotors, including a rotor 200. Rotor 200 is the aft-most rotor of low pressure compressor section 44.

A bleed inlet 256 is defined by a low pressure compressor case 262 and/or an intermediate case 265 and is positioned aft of the aft-most rotor 200 of low pressure compressor section 44. Stated differently, bleed inlet 256 is downstream from low pressure compressor 44 and upstream from high pressure compressor 52. Air received by bleed inlet 256 is received by a bleed port 201. As air is compressed by low pressure compressor section 44, the air is propelled aft such that the air flows towards high pressure compressor section 52 from low pressure compressor section 44, as illustrated by arrow 204. A majority of the air flow labeled with arrow 211 is directed to high pressure compressor section 52, as illustrated by arrow 211. However, some of the air is received by bleed inlet 256, as illustrated by arrow 206 and arrow 208, and continues to flow through bleed port 201.

Bleed inlet 256 is defined between a forward point 264 and an aft point 212. Forward point 264 and aft point 212 are positioned between low pressure compressor 44 and high pressure compressor 52. Forward point 264 is positioned radially outward from aft point 212. Accordingly, bleed inlet 256 has an axial component 295. Axial component 295 allows a predetermined amount of the air exiting low pressure compressor section 44 to be received by bleed inlet 256, as the airflow has a larger axial component than radial or circumferential.

A flow splitter 210 is positioned radially between forward point 264 and aft point 212. An upstream inlet 271 is defined between forward point 264 and flow splitter 210 and a downstream inlet 205 is defined between flow splitter 210 and aft point 212. Upstream inlet 271 is positioned radially outward from downstream inlet 205. Air received by upstream inlet 271 can flow through an upstream bleed channel 203, as illustrated by arrow 206, and air received by downstream inlet 205 can be received by a downstream bleed channel 207, as illustrated by arrow 208. Downstream bleed channel 207 receives between 1 percent (1%) and 6 percent (6%) of the total airflow that exits low pressure compressor section 44.

Upstream bleed channel 203 is defined by an upstream forward wall 280 extending radially outward and axially aft from forward point 264 and an upstream aft wall 282 extending radially outward and axially aft from flow splitter 210. A valve 254 is coupled to upstream bleed channel 203. Valve 254 can be adjusted to allow various percentages of the airflow received by upstream bleed channel 203 to exit gas turbine engine 20. Valve 254 is adjusted based on a power requested of gas turbine engine 20. For example, as less power is requested of gas turbine engine 20, valve 254 is increasingly opened.

In conventional systems, debris received by a gas turbine engine during takeoffs flow through the low pressure compressor section of the gas turbine engine. Due to the density of the debris particles being greater than the density of the air, after flowing through the last rotor of the low pressure compressor section, the debris particles are forced towards the outer diameter of the low pressure compressor section of the gas turbine engine. Accordingly, these debris particles are received by a stability bleed port and ejected from the aircraft. Upstream bleed channel 203 functions in a similar manner and thus can be a stability bleed port. However, any debris flowing through the low pressure compressor section will not exit via the stability bleed port in response to the valve of a conventional gas turbine engine being closed. Accordingly, the debris can be received by the high pressure compressor section, where it can cause undesirable results.

Downstream bleed channel 207 is defined by a downstream bleed forward wall 272 extending aft from flow splitter 210 and a downstream bleed aft wall 274 extending aft from aft point 212. Aft of downstream inlet 205, airflow from downstream bleed channel 207 is received by an air port 218 and a debris port 220 that are separated by an inner wall 270. Debris port 220 can receive between 0.1% and 10% of the airflow flowing through downstream bleed channel 207 and the remaining air is received by air port 218. The airflow received by air port 218 can flow to an environmental control system, from which it can be provided to an aircraft cabin in order to pressurize and to provide fresh air to the cabin. Stated differently, downstream bleed channel 207 may be an environmental control system (ECS) port.

Debris port 220 is designed such that it receives a majority of the debris received by downstream bleed channel 207. The airflow received by debris port 220 flows to an area external to gas turbine engine 20. Thus, the debris received by debris port 220 is ejected from the gas turbine engine. This reduces an amount of debris reaching high pressure compressor section 52 and entering the cabin, even in response to valve 254 being closed.

Air entering downstream bleed channel 207 can include an undesirable swirl component. Downstream bleed channel 207 includes an airfoil 217 having a leading edge 214 and a trailing edge 216. Airfoil 217 functions as a stator, conditioning the air flowing through downstream bleed channel 207. Conditioning the air can indicate a straightening of the airflow. This conditioning reduces the amount of swirl in the airflow.

It is desirable for the velocity of air flowing through downstream bleed channel 207 to be reduced. Similarly, air entering downstream bleed channel 207 tends to have an undesirably high velocity. Airfoil 217 also functions as a diffuser for the airflow, resulting in a lowered velocity of the airflow.

A forward diameter 258 of downstream bleed channel 207 is positioned nearer downstream inlet 205 than an aft diameter 260 of downstream bleed channel 207 and is greater than aft diameter 260. Because the diameter of downstream bleed channel 207 increases farther from downstream inlet 205, the airflow expands into the greater volume and loses velocity.

Downstream bleed forward wall 272 can be an edge of a low pressure compressor case 262 and Downstream bleed aft wall 274 can be an edge of an intermediate case 265. Airfoil 217 is coupled to Downstream bleed forward wall 272 and Downstream bleed aft wall 274 and can function as structural bridges between low pressure compressor case 262 and intermediate case 265. Stated differently, airfoil 217 provides structural support between low pressure compressor case 262 and intermediate case 265, resisting movement of low pressure compressor case 262 relative to intermediate case 265 and resisting movement of intermediate case 265 relative to low pressure compressor case 262.

Figure 3:
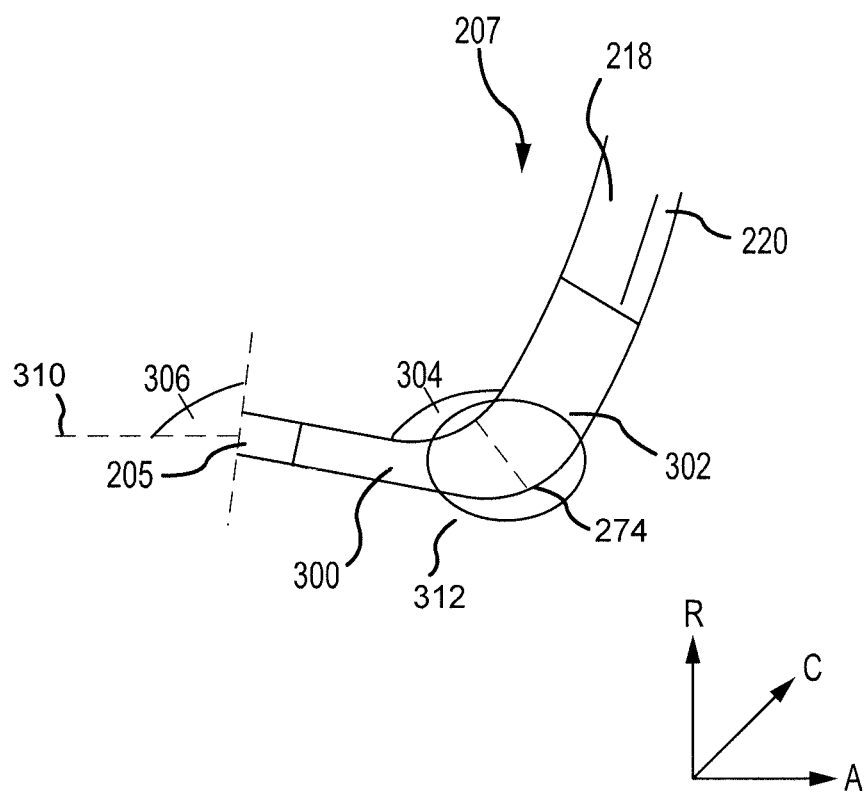
FIG. 3 illustrates a cross-sectional view of the ECS bleed port of FIG. 2, in accordance with various embodiments.

With reference now to FIG. 3, downstream bleed channel 207 includes an axial portion 300 and a radial portion 302. Axial portion 300 has a greater distance in the axial direction than the radial direction and radial portion 302 has a greater distance in the radial direction than the axial direction. Downstream bleed channel 207 includes a curved portion 312 between axial portion 300 and radial portion 302. Curved portion 312 has an angle 304 that is between 30 degrees and 130 degrees. Stated differently, angle 304 between axial portion 300 and radial portion 302 is between 30 degrees and 130 degrees. The curvature of curved portion 312 directs the airflow toward the ECS system.

The curvature of curved portion 312 also directs the debris toward debris port 220. As the debris has greater density than the air in downstream bleed channel 207, the debris will have a trajectory towards Downstream bleed aft wall 274. As a result of the curvature, as opposed to an angular transition between axial portion 300 and radial portion 302, the debris will remain closer to Downstream bleed aft wall 274 than Downstream bleed forward wall 272. Accordingly, a majority of the debris is received by debris port 220.

An angle 306 is present between downstream inlet 205 and a line 310 parallel to the A axis. Downstream inlet 205 includes an axial component. Stated differently, angle 306 is between 45 degrees and 135 degrees. It is desirable for the ECS system to receive air of a certain pressure as this air is used to pressurize the cabin. As downstream inlet 205 includes an axial component, a majority of the total pressure of the air received by downstream inlet 205 is retained.

Benefits, other advantages, and solutions to problems have been described herein with regard to specific embodiments. The scope of the disclosure, however, is provided in the appended claims.

The invention claimed is:

1. A compressor section of a gas turbine engine comprising:
a bleed port having a flow splitter therein so as to define a downstream bleed channel having a downstream inlet and an upstream bleed channel having an upstream inlet that is positioned radially outward from the downstream inlet, wherein the upstream inlet is defined between a forward point and the flow splitter and the downstream inlet is defined between the flow splitter and an aft point, wherein the flow splitter is positioned axially aft of the aft point.

2. The compressor section of claim 1, wherein the downstream bleed channel is an ECS port.

3. The compressor section of claim 2, wherein the upstream bleed channel is a stability bleed port.

4. The compressor section of claim 1, wherein the downstream bleed channel receives between 1 percent and 6 percent of air propelled aft from a low pressure compressor section of the compressor section.

5. The compressor section of claim 1, wherein the flow splitter is positioned radially between the forward point and the aft point.

6. The compressor section of claim 1, wherein the downstream bleed channel further includes an axial portion, a radial portion and a curved portion such that an angle between the axial portion and the radial portion is between 30 degrees and 130 degrees.

7. The compressor section of claim 1, wherein the downstream bleed channel is defined between a compressor edge of a low pressure compressor case and an intermediate edge of an intermediate case.

8. The compressor section of claim 1, further comprising an inner wall positioned within the downstream bleed channel defining a debris port and an air port.

9. The compressor section of claim 8, wherein the air port is positioned axially forward of the debris port.

10. The compressor section of claim 1, further comprising an airfoil positioned within the downstream bleed channel and configured to condition a flow of air, wherein the airfoil is coupled to and extends between a downstream bleed forward wall extending aft from the flow splitter and a downstream bleed aft wall extending aft from the aft point.

11. A compressor section of a gas turbine engine comprising:
a bleed port having a flow splitter therein defining an upstream bleed channel and a downstream bleed channel having an axial portion, a radial portion, and a curved portion disposed between the axial and radial portions; and
an inner wall positioned within the downstream bleed channel and defining a debris port and an air port.

12. The compressor section of claim 11, further comprising an airfoil positioned within the downstream bleed channel and configured to condition a flow of air, wherein the airfoil is coupled to and extends between opposing walls that define the downstream bleed channel.

13. The compressor section of claim 11, wherein the bleed port is positioned downstream from a low pressure compressor section and upstream from a high pressure compressor section of the compressor section.

* * * * *